Figure 1:
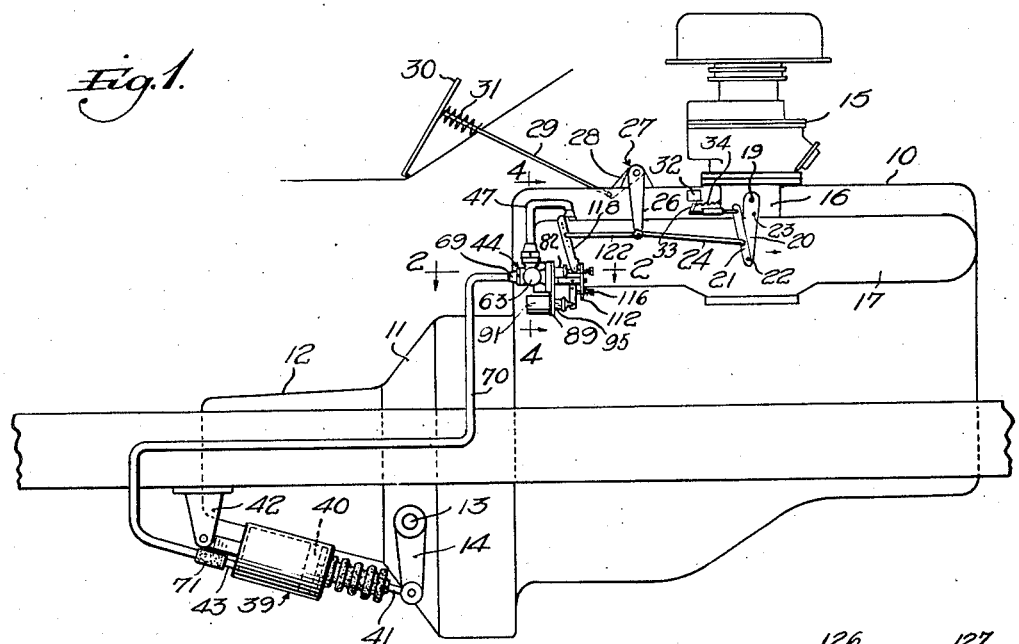

Dec. 19, 1944.  H. W. HEY ET AL  2,365,469
CLUTCH CONTROL MECHANISM
Filed June 22, 1942  2 Sheets-Sheet 1

Inventors
HENRY W. HEY
JEANNOT G. INGRES
Attorney

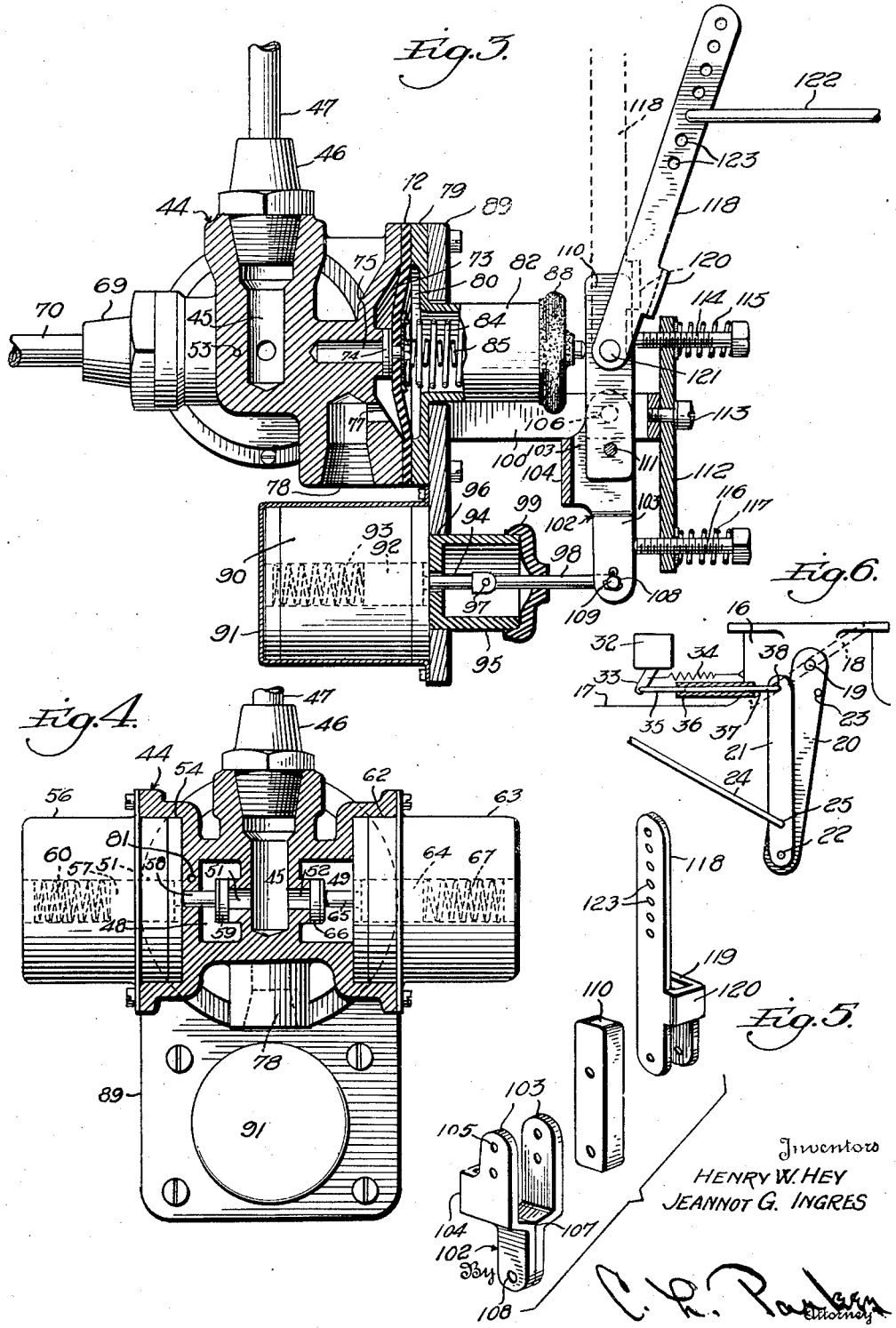

Patented Dec. 19, 1944

2,365,469

UNITED STATES PATENT OFFICE 2,365,469

CLUTCH CONTROL MECHANISM

Henry W. Hey, Richmond, Va., and Jeannot G. Ingres, Detroit, Mich., assignors to Hill Engineering Corporation, Richmond, Va., a corporation of Virginia Application June 22, 1942, Serial No. 447,992

26 Claims. (Cl. 192—.01)

This invention relates to clutch control mechanisms for motor vehicles.

In recent years highly efficient mechanisms have been developed for effecting disengagement of a motor vehicle clutch and accurately controlling the re-engagement of the clutch elements. The structure of the patent to Edward G. Hill No. 1,964,693, granted June 26, 1934, is an excellent example of such type of mechanism. The prior construction referred to provides for instantaneous disengagement of the clutch upon the releasing of the accelerator pedal, whereupon the gears may be shifted and the accelerator pedal depressed to accelerate the engine and effect re-engagement of the clutch through the control mechanism referred to. Such mechanism provides a highly efficient clutch engaging operation in that it effects the retarding or arresting of the clutch elements at the point of initial engagement thereof and controls the rate of movement of the clutch elements into operative engagement in accordance with the mode of operation of the accelerator pedal. Whether the movement of the clutch elements is arrested or merely retarded at the point of initial engagement also depends upon the mode of accelerator operation and the device functions so accurately that stalling of the motor upon initial engagement of the clutch elements is prevented, and racing of the motor incident to engagement of the clutch elements too late with respect to engine acceleration is also prevented.

An important object of the present invention is to provide a novel clutch control mechanism which is of a type wholly different from the type previously referred to wherein all of the highly efficient functions of such mechanism are provided while at the same time providing a mechanism which may be much more cheaply manufactured.

A further object is to provide such a clutch control mechanism wherein the use of relatively slidable follow-up control valves is eliminated, while providing the same functions as such a valve mechanism through the use of a novel arrangement of poppet or similar valves and novel control means therefor.

A further object is to provide a clutch control mechanism of a novel type wherein practically no machine operations are required in the manufacture of the device, thus permitting the device to be very economically manufactured which is a very important consideration in the highly competitive field to which the invention relates.

A further object is to provide a clutch control mechanism having novel lever means for operating the main control valve.

A further object is to provide such a device wherein control means is connected to the lever means to cause a different function thereof when the vehicle gear set is in first or reverse gears to cause a relative lagging of the movement of the clutch elements into operative engagement to positively prevent too rapid clutch engagement and possible stalling of the motor.

Other objects and advantages of the invention will become apparent during the course of the following description.

In the drawings we have shown one embodiment of the invention. In this showing—

Figure 2:
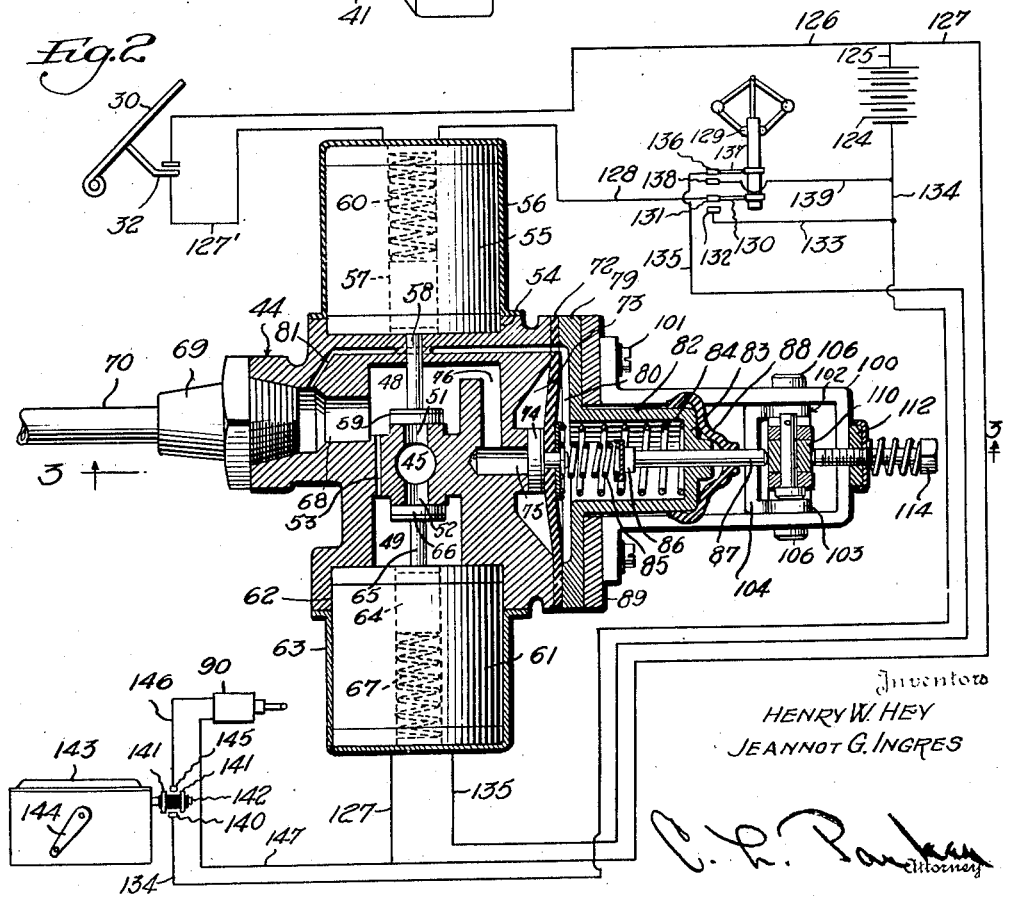

Figure 1 is a side elevation of a motor vehicle power plant showing the invention applied, Figure 2 is a central horizontal sectional view through the valve mechanism taken substantially on line 2—2 of Figure 1, parts being shown in elevation, and the electrical circuit for the apparatus being shown, Figure 3 is a vertical sectional view taken substantially on line 3—3 of Figure 2, parts being shown in elevation, Figure 4 is a sectional view on line 4—4 of Figure 1, Figure 5 is a detail perspective view of the valve controlled lever elements, the parts being shown separated, and, Figure 6 is an enlarged fragmentary side elevation of a portion of the engine manifold showing the throttle lever and the elements associated therewith.

Referring to Figure 1 the numeral 10 designates a conventional motor vehicle engine having a clutch 11 for delivering power to a transmission 12 in which the usual gear ratio changes are provided. The clutch is of a conventional type and the elements thereof (not shown) are controlled by a rock shaft 13 to which a crank 14 is connected.

The engine 10 is provided with the usual carburetor 15 shown in the present instance as being of the down-draft type mounted on the upper end of the intake pipe 16 (Figures 1 and 6) of the intake manifold 17. A conventional butterfly valve 18 is mounted in the intake pipe 16 and is carried by a shaft 19 to which a lever 20 is connected, this lever being turned in a manner to be described to operate the butterfly valve.

An auxiliary lever 21 is pivoted at its lower end as at 22 to the lower end of the lever 20 and assumes the position shown in Figure 6 when the butterfly valve is in the idling position. Upon operation of the accelerator pedal, to be described, the lever 21 will turn on its pivot 22 independently of the lever 20 until it contacts with a stop 23 carried by the lever 20, whereupon the two levers 20 and 21 will turn as a unit to open the butterfly valve. The lever 22 has a rod 24 connected thereto at the point 25 relatively close to the pivot point 22 and a substantial distance from the shaft 19. The rod 24 is connected to one arm 26 (Figure 1) of a bell crank lever 27 and the other arm 28 of this lever is connected by a rod 29 to a conventional accelerator pedal 30. Any suitable resilient means such as a spring 31 may be employed for urging the accelerator pedal toward its idling position.

As the accelerator pedal is released for movement toward idling position, the levers 20 and 21 will turn as a unit about the axis of the shaft 19 until the butterfly valve 18 reaches idling position, after which further additional slight movement of the accelerator pedal will turn the lever 21 about its pivot 22 to the position shown in Figure 6. This additional movement is utilized to operate a switch 32 (Figures 1, 2 and 6). This switch is of the toggle type having an operating lever 33 biased to open position by a spring 34. A rod 35 is connected at one end to the lever 33 and carries a sleeve 36 projecting axially therefrom and slidably receiving a rod 37 connected at 38 to the upper end of the lever 21. When this lever turns in a clockwise direction about its pivot 22 from the position shown in Figure 6, the rods 35 and 37 and sleeve 36 move as a unit until the spring 34 moves the switch arm 33 to its open position. Further movement of the lever 21 takes place with the rod 37 sliding in the sleeve 36 away from the end of the rod 35. As the accelerator pedal is released after the butterfly valve 18 reaches idling position, the end of the rod 37 in the sleeve 36 will engage the adjacent end of the rod 35 to move the switch 33 to closed position. This operation assists in controlling a circuit to be referred to later.

The clutch operating crank 14 is adapted to be moved and controlled by a motor 39. This motor is preferably differential fluid pressure operated and is provided with a piston 40 connected by a piston rod 41 to the lower end of the crank 14. The opposite end of the motor 39 is pivoted to a bracket 42 to permit it to swing in accordance with movement of the crank 14. The end of the motor 39 toward the crank 14 is preferably open to the atmosphere and the opposite end of the motor is provided with a pipe 43 adapted for connection in a manner to be described with a source of partial vacuum.

A control valve mechanism for the clutch motor 39 is shown in Figures 2, 3 and 4 of the drawings. The valve mechanism comprises a preferably die cast body indicated as a whole by the numeral 44 provided with a vertical passage 45 the upper end of which is connected by a union 46 to a pipe 47 having its other end connected to the intake manifold 17. The body 44 is provided with a pair of chambers 48 and 49 (Figures 2 and 4) and these chambers are adapted to communicate with the vacuum passage 45 through ports 51 and 52 respectively. The chambers 48 and 49 are in fixed restricted communication with each other through a bleed passage 53 (Figure 2) for a purpose to be described.

The body 44 is provided with a circular seat 54 for receiving the inner end of a solenoid 55 which may be provided with a protective cap 56 and this cap may be secured to the valve body 44 to retain the solenoid 55 in position. The solenoid 55 is provided with an armature 57 having a stem 58 to the end of which is connected a valve 59 seating against the adjacent end of the port 51 to form a closure therefor. The valve 59 is preferably provided with a rubber or other deformable facing to permit it to seat tightly without the necessity for its having to be machined. A spring 60 seats the valve 59 and this valve obviously is pulled from its seat when the solenoid 55 is energized.

A second solenoid 61 is received in a circular seat 62 in axial alinement with the seat 54 and the solenoid 61 is also capped as at 63. This cap may be secured to the valve body 44 to fix the position of the solenoid 61. The armature 64 of the solenoid 61 carries a stem 65 to the end of which is connected a valve 66 also preferably rubber-faced and adapted to close the port 52. A spring 67 engages the armature 64 to tend to hold the valve 66 in closed position.

A relatively large port 68 communicates with the chamber 48 and is connected by a union 69 to one end of a pipe 70. Referring to Figure 1 it will be noted that this pipe leads to the vacuum motor 39 and is connected to the nipple 43 by a flexible hose 71 to permit the swinging movement of the motor 39.

The valve body 44 has a diaphragm 72 mounted against one side thereof (Figures 2 and 3) and this diaphragm forms one wall of a chamber 73 formed in the adjacent wall of the valve body 44. The diaphragm 72 carries a preferably rubber faced valve 74 closing the adjacent end of a port 75 connected to the chamber 48 by a passage 76. Referring to Figure 3, the chamber 73 inwardly of the diaphragm 72 is connected by a port 77 to a port 78 which is open to the atmosphere and is preferably threaded as shown in Figure 3 for connection with a suitable small air cleaner (not shown).

A cap 79 is arranged over the diaphragm over the diaphragm 72 and forms therewith a pressure chamber 80 which communicates with the port 68 through a passage 81 (Figure 2). This passage maintains in the chamber 80 a pressure at all times equal to the pressure to which the vacuum chamber of the motor 39 is subjected for a reason to be referred to later. The passage 81 may directly communicate with the chamber 48 or passage 76 but its connection with the port 68 adjacent the union 69 is preferred because of the slightly reduced fluctuations in pressure therein incident to the opening and closing of the valve 59.

The cap 79 is provided with a cylindrical extension 82 having a closed outer end 83 as shown in Figure 2. A coil spring 84 is arranged between the end 83 and the diaphragm 72 to exert a pressure constantly tending to seat the valve 74. An inner coil spring 85 also exerts an inward force against the diaphragm 72 for the same purpose. The outer end of the spring 85 engages a spring seat 86 carried by a stem 87 slidable in the end 83 of the extension 82. The latter portion of the extension 82 is preferably covered by a rubber boot 88 snugly surrounding the stem 87 to prevent the entrance of dust or other foreign material into the bearing in which the stem 87 is slidable. Means to be referred to later are employed for varying the compression of the spring 85 to vary the pressure tending to seat the valve 74.

A supporting plate 89 is carried by the cap 79 and projects a substantial distance below the bottom of the valve body 44 to support a solenoid 90 housed in a cap 91 secured to the plate 89. The solenoid 90 is provided with an armature 92 urged in one direction by a spring 93 and provided with a stem 94 (Figure 3). A cup 95 projects through an opening 96 in the plate 89 and within this cup the stem 94 is pivoted as at 97 to a link 98 for a purpose to be described. A rubber or similar boot 99 fits over the end of the cup 95 and surrounds the link 98.

A novel lever mechanism is employed for controlling the tension of the spring 85 (Figures 2 and 3) and this lever mechanism, in turn, is controlled in a novel manner to provide for a different mode of clutch engagement when the vehicle is in low or reverse gears to provide a slightly lagging clutch engagement under such conditions. Referring to Figures 2 and 3, the numeral 100 designates a yoke secured as at 101 against the plate 89. A lever indicated as a whole by the numeral 102 is supported for pivotal movement by the yoke 100. The lever 102 comprises spaced arms 103 preferably integrally formed with a connecting yoke element 104 as shown in Figures 2 and 5. The upper ends of the arms 103 are provided with openings 105 to receive pivot pins 106 by means of which the lever 102 is pivotally connected to the yoke 100. The lower ends of the arms 103 may be bent together as at 107 to be brought into contact with each other and the lower ends of these arms are provided with openings 108 (Figure 5) to receive the bent end 109 of the link 98 whereby the latter is pivotally connected to the lower end of the lever 102.

A straight relatively thick lever 110 has its lower end arranged between the spaced portions of the lever arms 103 as shown in Figures 2 and 3 and is pivotally connected to the lever 102 as at 111. It will be apparent that the lever 110 swings about the pivot 111. The lever 102 swings about the pivot 106, and the latter swinging movement is adapted to alter the position of the pivot pin 111 to provide for a difference in the mode of clutch engagement when in first and reverse gears, as will be described.

A plate 112 is secured to the yoke 100 as at 113. A screw 114 is threaded through this plate adjacent the upper end thereof and the inner end of this screw engages the lever 110 to limit its upward movement with respect to the valve mechanism. The screw 114 is surrounded by a spring 115 which frictionally engages the plate 112 and the head of the screw 114 to hold the screw in adjusted position. A similar screw 116, surrounded by a spring 117 to hold it in adjusted positions, has its inner end engageable with the edge of the lever 102 adjacent the lower end thereof to limit its outward movement. In their normal positions, the levers 102 and 110 are approximately in alinement with each other.

Movement is imparted to the lever 110 to compress the spring 85 by an operating lever 118. This lever has a parallel arm 119 integrally connected therewith by a yoke 120 and the two arms at the lower end of the lever 118 straddle the lever 110 at a point spaced from the upper end thereof and are pivotally connected to the lever 110 as at 121. The lever 118 is freely movable for turning movement in a counter-clockwise direction from the position shown in Figure 3 to the dotted line position, at which point the yoke 120 engages the edge of the lever 110. Further movement of the lever 118 will then transmit movement to the lever 110 to swing it in a counter-clockwise direction about its pivot 111 to compress the spring 85. Movement is imparted to the lever 118 in accordance with movement of the engine throttle and the accelerator 30. In the present instance a rod 122 (Figure 1) has one end pivotally connected to the lever arm 26 and its other end pivotally connected to the lever 118 by engagement in either of a plurality of openings 123. The provision of a number of openings 123 is obviously for the purpose of adjusting the degree of movement of the lever 118 for a given movement of the lever arm 126.

The electrical system for the apparatus is shown in Figure 2. The battery 124 of the vehicle, or other suitable source of current, has one terminal connected to a wire 125 from which wires 126 and 127 branch, the wire 126 leading to the accelerator controlled switch 32. This switch is preferably controlled in the manner shown in Figure 6 and is shown for simplicity of illustration in Figure 2 as being directly connected to the accelerator. From the switch 32 a wire 127 leads to one terminal of the solenoid 55 and the other terminal of this solenoid is connected to a lead wire 128.

Any suitable form of governor 129 is connected with a driven part of the vehicle to be responsive to vehicle speed and a movable part of the governor is provided with a switch arm 130 carrying a contact 131 to which the wire 128 is connected. The contact 131, at relatively low vehicle speeds, engages a contact 132 connected by a wire 133 to a wire 134 leading to the other terminal of the source 124. The wire 127 leads to one terminal of the solenoid 61 and the other terminal of this solenoid is connected by a wire 135 to a contact 136 carried by a switch arm 137 which, in turn, is carried by a movable part of the governor 129. At low vehicle speeds the contact 136 engages a contact 138 connected by a wire 139 to the wire 134.

The wire 134 leads to a stationary contact 140 engageable by either of a pair of contact rings 141 carried by an extension 142 on the low and reverse gear shifting member of a conventional transmission 143 having its shift lever indicated by the numeral 144. The contact rings 141 are likewise engageable with a contact 145 connected by a wire 146 to one terminal of the solenoid 90, the other terminal of this solenoid being connected by a wire 147 to the wire 127. The contacts 140 and 145 are stationary and are arranged between and out of engagement with the contact rings 141 when the low and reverse gear shiftable element of the transmission is in neutral position. This condition, of course, is true when the transmission is in neutral or in second or high gears. Thus it will be apparent that the circuit through the solenoid 90 will be completed only when the transmission is in low or reverse gears, either ring 141 engaging the contacts 140 and 145 depending upon whether the shift is made into low or reverse gear.

The operation of the apparatus is as follows:

Assuming that the engine is running with the gear shift in neutral position the various parts of the apparatus will be in the positions shown in Figure 1 with the lever 21 in its extreme left hand position corresponding to the position shown in Figure 6. Under such conditions, the switch 32 will be energized to close the circuit through the solenoid 55 (Figure 2) the governor controlled contacts 131 and 132 being in engagement with each other. The valve 59 thus will be in open position and the vacuum passage 45 will be connected to the clutch motor 39 through the pipe 70. Thus the clutch will be disengaged. Since the vehicle is at a standstill, the contacts 136 and 138 also will be in engagement with each other, and accordingly the solenoid 61 will be energized to hold the valve 66 open. Accordingly the vacuum passage 45 will communicate through port 52 with the chamber 49 which is in constant restricted communication with the chamber 48 through the restricted passage 53. The fact that the valve 66 is open under the conditions referred to makes no difference in the operation of the apparatus, the functioning of the parts being controlled later by the valve 66 as will be described.

Assuming that the operator now desires to start the vehicle moving, he will shift into low gear, thus completing the circuit through the solenoid 90 through one of the rings 141. Referring to Figure 3 it will be noted that energization of the solenoid 90 will pull the lower end of the lever 102 toward the left, thus shifting the pivot 111 of the lever 110 in the same direction to a limited extent. With the accelerator pedal released, the lever 118 through its yoke 120 will have moved the lever 110 in a counterclockwise direction about its pivot 111 from the position shown in Figure 3, and upon energization of the solenoid 90 the movement of the pivot 111 to the left will swing the lever 110 bodily to a slight extent in the same direction thus increasing the loading of the spring 85. Under such conditions it will require greater differential pressures on opposite sides of the diaphragm 72 to pull the valve 74 from its seat than is true under the conditions present when shifting into second and high gears, as will be described.

Having made the shift into low gear, the operator will depress the accelerator pedal (Figure 1) thus swinging the bell crank lever 27 in a counter-clockwise direction to move the lever 21 (Figures 1 and 6) in a clockwise direction. Since the pivot 25 is close to the pivot 22 very slight movement of the accelerator pedal will swing the lever 21 into engagement with the stop 23 and during this movement the spring 34 pulls the switch arm 33 to open the switch 32 and thus deenergize the solenoid 55 (Figure 2). The spring 60 will promptly close the valve 59 but the vacuum in the motor will not be affected since the valve 66 will remain open to tend to constantly exhaust air through the restricted passage 53 (Figure 2).

Further depression of the accelerator pedal, with the lever 21 in engagement with the stop 23, will turn the levers 20 and 21 as a unit about the axis of the shaft 19 (Figure 6) to progressively open the throttle 18. During such movement, the rod 122 will pull to the right (Figure 3) on the upper end of the lever 118 and with the lever 110 engaging the yoke 120, the levers 110 and 118 will move as a unit about the axis of the pivot pin 111. This movement progressively releases the tension of the spring 85, thus reducing pressure on the right hand side of the diaphragm 72, as viewed in Figure 3. Attention is invited to the fact that the chamber 80 (Figures 2 and 3) is in constant communication with the port 68 (Figure 3) through passage 81 and accordingly any pressure present in the pipe line 70 will be duplicated in the chamber 80. At the same time, the chamber 73 at the opposite side of the diaphragm 72 is always open to the atmosphere through ports 77 and 78 (Figure 3).

Thus it will be apparent that during the operation referred to differential pressure on opposite sides of the diaphragm 72 tends to unseat the valve 74 but when the accelerator is in idling position the maximum loading of the spring 85 added to the fixed loading of the spring 84 is sufficient to hold the valve 74 seated. As the accelerator is depressed in the manner described, however, the lever 110 starts to move from its extreme left hand position as viewed in Figure 3 in the manner described and such movement progressively reduces the loading of the spring 85 up to the point at which the lever 118 contacts with its stop screw 114. Initial movement of the lever 21 (Figures 1 and 3) that is, movement of the lever 21 up to the point where it contacts with the stop 23, moves the lever 118 and consequently the lever 110 to slightly reduce the loading of the spring 85 but when the vehicle is in low and reverse gears with the pivot point 111 moved slightly to the left of its position in Figure 3, the loading of the spring 85 will not be reduced quite to the point at which differential pressures in the chambers 73 and 80 will unseat the valve 74 at the same time the lever 21 engages the stop 23.

However, depression of the accelerator pedal beyond the point at which the lever 21 engages the stop 23 will start to open the throttle 18 as previously stated, and after slight initial opening movement of the throttle the additional movement of the lever 110 to the right about its pivot 111 (Figure 3) will reduce the loading of the spring 85 to the point where the valve 74 will be unseated. It will be apparent that movement of the valve from its seat under the influence of differential pressures will tend to increase the loading of the spring 85 and an actual balancing of the loading of the springs 84 and 85 and the differential pressures affecting the diaphragm will be reached with a slight unseating movement of the valve 74.

Upon the unseating of the valve 74 air will flow from the chamber 73 (Figure 3) into the port 75 (Figure 2) thence through chamber 48 into the pipe 70 and into the vacuum end of the motor 39. There will be a sufficient increase in pressure in the motor 39 to permit the clutch springs (not shown) to move the clutch elements (not shown) toward the point of initial engagement. The increase in pressure in the chamber 48 will be accompanied by a corresponding increase in pressure in the chamber 80 (Figure 2) through passage 81 and upon initial unseating of the valve 74, therefore, this valve will almost immediately move back toward its closed position but will not quite reach such position, thus continuing to admit air at a reduced rate into the clutch motor.

It will be apparent that when the differential pressure affecting the motor piston 40 is slightly less than is required to hold the piston against the pull of the clutch springs, the latter immediately move the parts connected thereto at a relatively rapid rate and the movement of the piston 40 expands the vacuum end of the motor to greatly increase its volume to tend to reduce pressure therein. The pressure in the motor will be determined by the degree of opening of the valve 74 (Figure 2) the area of the piston 40 (Figure 1) and the speed of movement of this piston. When the clutch elements initially contact there will be an instantaneous reduction in the speed of movement of the piston 40, and an instantaneous increase in pressure in the motor and in the vacuum lines thereto will occur, and this will involve an increase in pressure in the chamber 80 (Figure 2) through passage 81. The increase in pressure in the chamber 80 reduces the differential pressures tending to move the diaphragm 72 to hold the valve 74 open, and this valve will immediately close, or almost completely close, depending upon the mode of operation of the accelerator, to be referred to, and accordingly the admission of air through port 75 will be completely or almost completely cut off. Thus the movement of the clutch elements will be either greatly retarded or completely arrested at the point of initial engagement of the clutch elements.

If the operator depresses the accelerator pedal slowly during the operation referred to the valve 74 will completely close. However, if the accelerator is more rapidly depressed to more rapidly decrease the loading of the spring 85, the valve 74 will not move completely to closed position and will therefore admit air relatively slowly into the clutch motor. At this time the functioning of the restricted passage 53 (Figure 2) is of great importance. With the valve 66 open, air will be slowly exhausted through passage 53, chamber 49, port 52 and vacuum passage 45, thus constantly tending to reduce pressures in the vacuum lines to the motor 39. If the movement of the clutch plates is arrested at the point of initial engagement and the valve 74 completely closes, the exhaustion of air through passage 53 will tend to move the clutch plates out of engagement and since the reduction in pressure of the clutch motor will likewise occur in the chamber 80 (Figure 2), any reduction in pressure sufficient to disengage the clutch elements will be sufficient to reestablish the differential pressures in the chambers 73 and 80 necessary to the slight unseating of the valve 74 to again admit air into the system through port 75. This operation therefore provides for the maintenance of a constant pressure in the system if the operator should stop the movement of the accelerator pedal at the point in the operation where initial contact of the clutch elements takes place. If, after slightly depressing the accelerator pedal the operator should desire to delay his start, for example, upon the approach of other cars as he is pulling away from a curb, a slight releasing of the accelerator pedal will result in slight movement of the levers 118 and 110 to the left of the position shown in Figure 3. This will increase the loading of the spring 85 to require greater differential pressure in the chambers 73 and 80 to unseat the valve 74 and accordingly the exhausting of air through passage 53 will reduce the pressure in the clutch motor to the point where the clutch elements are disengaged before the pressure will be reduced in the chamber 80 to a sufficient extent to slightly unseat the valve 74 to again establish uniform pressure. This uniform pressure will be less than that required to hold the clutch plates at the point of initial engagement and accordingly the clutch plates will remain slightly disengaged if the operator slightly releases the accelerator pedal. The greater the extent to which the accelerator pedal is released, the greater will be the loading of the spring 85. Similarly, the greater the loading of the spring 85 the greater will be the differential pressures necessary to unseat the valve 74 and the greater will be the movement of the clutch plates away from each other. Thus it will be apparent that the cooperative relation between the leakage port 53, the pressure chambers 73 and 80 and the springs 84 and 85 is such as to provide a degree of maneuverability of the clutch plates which is far more accurate than can be practiced by the average driver.

Assuming that the driver will have desired to continue the forward movement of the vehicle and to shift through the several gears of the transmission, he will have depressed the accelerator pedal in a continuous movement after the lever 21 (Figure 6) engages the stop 23. Such movement will progressively open the throttle to accelerate the engine and will progressively release the levers 110 and 118 for bodily movement in a clockwise direction about the pivot pin 111, thus progressively reducing the loading of the spring 85. As the loading of the spring 85 decreases, less differential pressure is required to unseat the valve 74 and accordingly pressures will continue to increase in the clutch motor to permit the clutch springs to effect clutch engagement up to the point of final operative engagement. Very low differential pressures are necessary to unseat the valve 74 when the lever 110 reaches its point of contact with the stop screw 114 and this differential pressure will not be sufficient to move the clutch plates away from a complete operative engagement but will merely tend to slightly reduce the force of the clutch springs in maintaining the clutch plates in full operative engagement. The exhausting of air through the leakage passage 53 does not alter this fact in any way since, as air is exhausted through this passage air is admitted into the system at the same rate through the port 75 for the reason that the valve 74 is readily unseated by relatively slight differential pressures on opposite sides of the diaphragm 72.

Beyond the point at which full clutch engagement takes place, that is, the point at which the lever 110 engages the screw 114, further movement of the throttle incident to further depression of the accelerator pedal will have no effect on the valve mechanism, the lever 118 swinging about its pivot 121 (Figure 3) in a clockwise direction as the throttle continues to open. After the vehicle attains sufficient speed in low gear, the operator will release the accelerator pedal, whereupon it returns to its released position while the throttle returns to idling position and the movement of the bell crank lever 27 during such movement swings the lever 118 (Figure 3) in a counter-clockwise direction about the pivot 121. Thereafter, the yoke 120 engages the lever 110 and the levers 110 and 118 turn as a unit about the pivot 111 to load the spring 85 and hold the valve 74 on its seat.

The accelerator pedal moves slightly beyond the position corresponding to the idling position of the engine throttle and as the accelerator pedal is released beyond the latter position, it will move the lever 21 in a counter-clockwise direction about the pivot 22 to close the switch 32. Very slight movement of the accelerator pedal is necessary for this purpose due to the short lever arm between the points 22 and 25 (Figure 6) and the long lever arm between the points 22 and 38. The closing of the switch 32 again energizes the solenoid 55 to open the vacuum valve 59. This affords relatively unrestricted communication between the clutch motor and the source of vacuum aand almost instantaneously disengages the clutch preparatory to the shift into second gear.

As soon as the shift is made out of low gear the circuit through the solenoid 90 (Figures 2 and 3) will be broken and the armature 92 will move the lower end of the lever 102 back to its normal position in engagement with the stop screw 116. This operation moves the pivot point 111 slightly to the right, as viewed in Figure 3, of its position when the gear set is in low gear, and accordingly it will be apparent that for any given position of the lever 110, after the shift is made out of low gear, the spring 85 will be loaded less than when the gear set was in low gear. The operation of engaging the clutch elements after the shift has been made into second gear will be exactly the same as for low gear except as the operation is affected by the slight unloading of the spring 85 in the manner stated. In other words, as the accelerator is depressed initial clutch engagement will occur approximately at the point where the lever 21 engages the stop 23 (Figure 6) to start to open the throttle 18 instead of at a slightly later point as was true in low gear, as described. Thus it will be apparent that a somewhat lagging engagement of the clutch elements is provided in low gear to prevent the stalling of the motor, some engine acceleration taking place prior to initial engagement of the clutch elements. In second gear this lagging is unnecessary since the vehicle will have attained substantial momentum and initial engagement of the clutch elements can efficiently take place substantially simultaneously with initial opening of the engine throttle. The same thing, of course, is true in high gear. Obviously the results provided in low gear are likewise provided in reverse gear, in both of which gears the vehicle is started from a standstill. One or the other of the rings 141 (Figure 2) will engage the contacts 140 and 145, depending upon whether a shift is made into low or reverse gears, to energize the solenoid 90 and thus provide for a slightly lagging clutch engagement when the vehicle is being started from a standstill.

Engagement of the clutch in high gear is identical with that which takes place in second gear, except for the possible operation referred to below. The leakage port 53 is provided in order to secure a high degree of maneuverability of the clutch elements when the vehicle is stationary or moving relatively slowly, particularly in first and reverse gears. This leakage port is unnecessary for the operation of the clutch control in high gear, or in second gear if substantial vehicle speed has been attained. The valve 66 which controls communication between the vacuum passage 45 and the leakage passage 53 is obviously controlled in accordance with vehicle speed. After a predetermined speed of the vehicle has been attained the governor 129 will disconnect the contacts 136 and 138, thus deenergizing the solenoid 61 and permitting the spring 67 to seat the valve 66. The leakage passage 53 thereupon becomes inoperative. Since shifts into high gear are practically always made above the speed at which the contacts 136 and 138 will be disengaged, the controlling of the clutch engagement takes place solely in accordance with variations in the loading of the spring 85. Clutch engagement may rapidly take place in high gear and accordingly the operator may rapidly depress the accelerator pedal as soon as the shift is made into high gear, thus rapidly reducing the loading of the spring 85 to render the air pressure in chamber 73 effective for fairly widely opening the valve 74 and maintaining it open to admit air into the clutch motor to provide rapid clutch engagement.

The same thing is true when clutch engagement takes place with the gear set in second gear. Rapid clutch engagement is permitted in second gear when the vehicle has attained substantial headway and ordinarily the vehicle will be traveling at such speed that the valve 66 will be closed. If the shift is made into second gear at relatively low vehicle speeds in which a finer control of clutch engagement is desirable, the contacts 136 and 138 will be in engagement with each other to energize the solenoid 61 and the leakage passage 53 will function in the same manner as for low gear.

The energization of the solenoid 61 (Figure 2) is dependent solely on vehicle speed as will be apparent from the foregoing. Energization of the solenoid 55 is dependent both on vehicle speed and the position of the accelerator pedal. For all gear shifts when starting a vehicle the speed of the vehicle will be such that the contacts 136 and 138 will be in engagement with each other so that any releasing of the accelerator pedal will energize the solenoid 55 and effect declutching. When the vehicle is traveling in high gear above the predetermined speed at which engagement of the contacts 136 and 138 is broken, releasing of the accelerator pedal will not affect the solenoid 55. Assuming therefore, that the governor is set to engage the contacts 136 and 138 at a speed below 15 miles per hour, the vehicle may travel in high gear and the operator may release the accelerator pedal at speeds above 15 miles per hour and the clutch will remain engaged to permit the engine to be used as a brake in accordance with common practice. If the vehicle is to be brought to a stop from a speed above the predetermined speed referred to, the releasing of the accelerator pedal will merely result in vehicle deceleration and when the point is reached for which the contacts 136 and 138 are set to engage, the solenoid 55 will be energized and the vehicle clutch will be disengaged.

The present construction provides a clutch control mechanism which has all of the advantages of prior constructions but is very much cheaper to manufacture. All of the solenoids are conventional relatively cheap units and all of the valve mechanism is made up of parts which are capable of economical manufacture. The valve body may be a single die casting and the three valves 59, 66 and 74 are simple rubber-faced valves of the poppet type which eliminate the machining required for the telescoping follow-up valves of prior constructions. The present construction, in fact, substantially eliminates all machining and all close tolerances in the manufacture of the parts and thus the device may be very economically produced. Fine adjustments may be easily provided and in actual operation it has been found that the adjustments are far more permanent than is true with prior telescoping follow-up valve mechanisms. Although the device is wholly different in its physical characteristics from prior follow-up valve mechanisms, it has been found that it functions to provide a perfect follow-up of the clutch elements with respect to operation of the accelerator pedal.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A clutch control mechanism comprising a power device connected to the clutch, a pair of independently operable control elements one having a normal position and movable away from such position to energize the power device and the other having a single normal position and movable away from such position for deenergizing the power device after it has been energized said second named control element being constructed and arranged to be subject to the force energizing said power device to tend to move it away from its normal position, and means constructed and arranged to be responsive to a predetermined condition for varying the degree of energization of said power device necessary to move said second named control element from its normal position.

2. A clutch control mechanism comprising a power device connected to the clutch, a pair of independently operable control elements one having a normal position and movable away from such position to energize the power device and the other having a single normal position and movable away from such position for deenergizing the power device after it has been energized, said second named control element being constructed and arranged to be subject to the force energizing said power device to tend to move it way from its normal position, means biasing said second named control element to its normal position, and means constructed and arranged to be responsive to a predetermined condition for controlling said biasing means to determine the degree of energization of said power device necessary to hold said second named control element away from its normal position.

3. A clutch control mechanism comprising a power device connected to the clutch, and a control mechanism for said power device comprising a pair of independently operable control elements one having a normal position and movable away from such position to energize the power device and the other having a single normal position and movable away from such position for progressively deenergizing the power device after it has been energized, said control mechanism having means operable for constantly tending in a limited degree to energize said power device whereby said second named control element is required to move to a predetermined extent away from its normal position before overbalancing the effect of said means to start to deenergize said power device, said second named control element being constructed and arranged to be subject to the force energizing said power device to tend to move it away from its normal position.

4. A clutch control mechanism comprising a power device connected to the clutch, a control mechanism for said power device comprising a pair of independently operable control elements one having a normal position and movable away from such position to energize the power device and the other having a single normal position and movable away from such position for progressively deenergizing the power device after it has been energized, said control mechanism having means operable for constantly tending in a limited degree to energize said power device whereby said second named control element is required to move to a predetermined extent away from its normal position before overbalancing the effect of said means to start to deenergize said power device, said second named control element being constructed and arranged to be subject to the force energizing said power device to tend to move it away from its normal position, and means for varying the degree of energization of said power device necessary to move said second named element away from its normal position.

5. A clutch control mechanism comprising a power device connected to the clutch, a control mechanism for said power device comprising a pair of independently operable control elements one having a normal position and movable away from such position to energize the power device and the other having a single normal position and movable away from such position for progressively deenergizing the power device after it has been energized, said control mechanism having means operable for constantly tending in a limited degree to energize said power device whereby said second named control element is required to move to a predetermined extent away from its normal position before overbalancing the effect of said means to start to deenergize said power device, said second named control element being constructed and arranged to be subject to the force energizing said power device to tend to move it away from its normal position, means biasing said second named control element to its normal position, and means for controlling said biasing means to determine the degree of energization of said power device necessary to hold said second named control element away from its normal position.

6. A clutch control mechanism comprising a differential fluid pressure operated power device connected to the clutch, a pair of independently operable poppet valves one having a given normal position from which it is movable to connect the power device to a source of pressure differential and the other having a normal position from which it is movable to tend to balance pressures in said power device, pressure responsive means connected to the second named valve and subject to the differential pressures affecting said power device to tend to move said second named valve from its normal position, and means for varying the differential pressures in said power device necessary to move and hold said second named valve away from its normal position.

7. A clutch control mechanism comprising a differential fluid pressure operated power device connected to the clutch, a pair of independently operable poppet valves one having a given normal position from which it is movable to connect the power device to a source of pressure differential and the other having a normal position from which it is movable to tend to balance pressures in said power device, pressure responsive means connected to the second named valve and subject to the differential pressures affecting said power device to tend to move said second named valve from its normal position, means biasing said second named valve to its normal position, and means constructed and arranged to be responsive to a predetermined condition for controlling said biasing means to determine the differential pressures in said power device necessary to move and hold said second named valve away from its normal position.

8. A clutch control mechanism comprising a differential fluid pressure operated power device connected to the clutch, and a control mechanism for said power device comprising a pair of independently operable poppet valves one having a normal position from which it is movable to connect the power device to a source of pressure differential and the other having a normal position from which it is movable to tend to balance pressures in said power device, said control mechanism having a leakage port affording limited communication between said power device and the source independently of the position of said first named valve whereby said second named valve is required to move a predetermined distance from its normal position before its tendency to balance pressures in said power device overcomes the effect of said leakage port in tending to maintain differential pressures in said power device, said second named valve being constructed and arranged to be subjected to differential pressures in said power device to tend to move it from its normal position.

9. A clutch control mechanism comprising a differential fluid pressure operated power device connected to the clutch, a control mechanism for said power device comprising a pair of independently operable poppet valves one having a normal position from which it is movable to connect the power device to a source of pressure differential and the other having a normal position from which it is movable to tend to balance pressures in said power device, said control mechanism having a leakage port affording limited communication between said power device and the source independently of the position of said first named valve whereby said second named valve is required to move a predetermined distance from its normal position before its tendency to balance pressures in said power device overcomes the effect of said leakage port in tending to maintain differential pressures in said power device, pressure responsive means connected to the second named valve and subject to differential pressures in said power device to tend to move said second named valve from its normal position, and means for varying the differential pressures in said power device necessary to move and hold said second named valve away from its normal position.

10. A clutch control mechanism comprising a differential fluid pressure operated power device connected to the clutch, a control mechanism for said power device comprising a pair of independently operable poppet valves one having a normal position from which it is movable to connect the power device to a source of pressure differential and the other having a normal position from which it is movable to tend to balance pressures in said power device, said control mechanism having a leakage port affording limited communication between said power device and the source independently of the position of said first named valve whereby said second named valve is required to move a predetermined distance from its normal position before its tendency to balance pressures in said power device overcomes the effect of said leakage port in tending to maintain differential pressures in said power device, pressure responsive means connected to the second named valve and subject to differential pressures in said power device to tend to move said second named valve from its normal position, means biasing said second named valve to its normal position, and means for controlling said biasing means to determine the differential pressure in said power device necessary to move and hold said second named valve away from its normal position.

11. A clutch control mechanism comprising a differential fluid pressure operated power device connected to the clutch, and a control mechanism for said power device having a chamber communicating with said power device, a vacuum passage and an atmospheric passage, a poppet valve controlling communication between said vacuum passage and said chamber, a second poppet valve controlling communication between said chamber and said atmospheric passage, means for opening said first named valve to energize said power device, means subject to differential pressures in the power device for opening said second named valve, means biasing said second named valve toward closed position, and means constructed and arranged to be responsive to a predetermined condition for controlling said baising means to determine the degree of differential pressure in said power device necessary to move and hold said second named valve away from closed position.

12. A clutch control mechanism constructed in accordance with claim 11 wherein said control mechanism is provided with a leakage passage affording restricted communication between said chamber and said vacuum passage independently of said first named valve whereby said second named valve must open to a predetermined extent to tend to deenergize said power device.

13. A clutch control mechanism for a motor vehicle having an engine, an accelerator-controlled throttle and a clutch, comprising a power device connected to the clutch, a pair of independently operable control elements, one having a normal position and movable away from such position to energize the power device and the other having a normal position and movable away from such position for deenergizing the power device, the second named control element being constructed and arranged to be subject to the power energizing said power device to tend to move it away from its normal position, and means mechanically connected to the accelerator for reducing the force necessary to hold said second named element in its normal position as the accelerator is moved from idling position.

14. Apparatus constructed in accordance with claim 13 provided with means operable when the accelerator is in idling position for moving said first named control element from its normal position to energize said power device.

15. A clutch control mechanism for a motor vehicle having an engine, an accelerator-controlled throttle and a clutch, comprising a power device connected to the clutch, a pair of independently operable control elements, one having a normal position and movable away from such position to energize the power device and the other having a normal position and movable away from such position for deenergizing the power device, the second named control element being constructed and arranged to be subject to the force energizing said power device to tend to move it away from its normal position, means biasing said second named control element to its normal position, and means mechanically operable by the accelerator as the latter moves from its idling position for reducing the force of said biasing means tending to hold said second named control element in its normal position.

16. Apparatus constructed in accordance with claim 15 provided with means operable when the accelerator is in its idling position for moving said first named control element away from its normal position to energize said power device.

17. A clutch control mechanism for a motor vehicle having an engine, an accelerator-controlled throttle and a clutch, comprising a power device connected to the clutch, a control mechanism for said power device comprising a pair of independently operable control elements one having a normal position and movable away from such position to energize the power device and the other having a normal position and movable away from such position for deenergizing the power device, said control mechanism having means operable for constantly tending in a limited degree to energize said power device whereby said second named control element is required to move to a predetermined extent from its normal position before overbalancing the effect of said means to start to deenergize said power device, the second named control element being constructed and arranged to be subject to the power energizing said power device to tend to move it from its normal position, and means mechanically connected to the accelerator for reducing the force necessary to hold the second named element in its normal position as the accelerator is moved from idling position.

18. Apparatus constructed in accordance with claim 17 provided with means operable when the accelerator is in idling position for moving said first named control element from its normal position to energize said power device.

19. A clutch control mechanism for a motor vehicle having an engine, an accelerator-controlled throttle and a clutch, comprising a power device connected to the clutch, a control mechanism for said power device comprising a pair of independently operable control elements one having a normal position and movable away from such position to energize the power device and the other having a normal position and movable away from such position for deenergizing the power device, said control mechanism having means operable for constantly tending in a limited degree to energize said power device whereby said second named control element is required to move to a predetermined extent from its normal position before over-balancing the effect of said means to start to deenergize said power device, the second named control element being constructed and arranged to be subject to the power energizing said power device to tend to move it from its normal position, means biasing said second named control element to its normal position, and means operable by the accelerator as the latter moves from its idling position for reducing the force of said biasing means tending to hold said second named control element in its normal position.

20. A clutch control mechanism for a motor vehicle having an engine, an accelerator-controlled throttle and a clutch, comprising a differential fluid pressure operated power device connected to the clutch, and control mechanism for said power device comprising a valve body having a chamber communicating with one end of the power device, said body having a vacuum passage and an atmospheric passage, a valve controlling communication between said vacuum passage and said chamber and biased to closed position, means for opening said valve when the accelerator is in idling position, a second valve controlling communication between said air passage and said chamber, spring means biasing said second valve to closed position, a pressure responsive device subject to pressures in said chamber to tend to unseat said second valve against the tension of said spring means, and means constructed and arranged to be responsive to a predetermined condition for progressively reducing the force of said spring means tending to seat said second valve as the accelerator moves away from idling position.

21. Apparatus constructed in accordance with claim 20 wherein said valve body is provided with a leakage passage communicating between said vacuum passage and said chamber to tend to maintain partial vacuum in said chamber when said first mentioned valve is closed.

22. Apparatus constructed in accordance with claim 20 wherein said valve body is provided with a leakage passage communicating between said vacuum passage and said chamber to tend to maintain partial vacuum in said chamber when said first mentioned valve is closed, and means for closing communication through said leakage passage when the vehicle is traveling above a predetermined speed.

23. Apparatus constructed in accordance with claim 20 wherein said valve body is provided with a leakage passage communicating between said vacuum passage and said chamber to tend to maintain partial vacuum in said chamber when said first mentioned valve is closed, a third valve controlling communication through said leakage passage and biased to closed position, and means comprising a solenoid energizable when the vehicle speed is below a predetermined point for opening said third valve.

24. A clutch control mechanism for a motor vehicle having an accelerator-controlled throttle, a clutch and a transmission, comprising a differential fluid pressure operated power device connected to the clutch, and a control valve mechanism for said power device comprising a valve body having a chamber communicating with one end of said power device, said valve body having a vacuum passage and an air passage, a valve controlling communication between said vacuum passage and said chamber and biased to closed position, means operable when the accelerator is in idling position for opening said valve, a second valve controlling communication between said air passage and said chamber, means responsive to partial vacuum in said chamber to tend to unseat said second valve, spring means biasing said second valve to closed position, accelerator-operated means for progressively reducing the loading of said spring means as the accelerator moves from idling position, and means operative under predetermined transmission conditions for increasing the loading of said spring means independently of the position of th accelerator.

25. A clutch control mechanism for a motor vehicle having an accelerator-controlled throttle, a clutch and a transmission, comprising a differential fluid pressure operated power device connected to the clutch, and a control valve mechanism for said power device comprising a valve body having a chamber communicating with one end of said power device, said valve body having a vacuum passage and an air passage, a valve controlling communication between said vacuum passage and said chamber and biased to closed position, means operable when the accelerator is in idling position for opening said valve, a second valve controlling communication between said air passage and said chamber, means responsive to partial vacuum in said chamber to tend to unseat said second valve, spring means biasing said second valve to closed position, accelerator-operated means for progressively reducing the loading of said spring means as the accelerator moves from idling position, said accelerator-operated means comprising a lever pivoted to turn about a predetermined axis and arranged to control the loading of said spring means, and means controlled in accordance with predetermined transmission conditions for moving said axis to cause said lever to increase the loading of said spring means.

26. A clutch control mechanism comprising a differential fluid pressure operated power device connected to the clutch, and a control mechanism for said power device having a chamber communicating with said power device, a vacuum passage and an atmospheric passage, a poppet valve controlling communication between said vacuum passage and said chamber, a second poppet valve controlling communication between said chamber and said atmospheric passage, said control mechanism having a leakage passage between said vacuum passage and said chamber to afford restricted communication between the power device and said vacuum passage independently of said first named valve whereby said second named valve must open at least to a predetermined extent to deenergize the power device, means for opening said first named valve to energize said power device, means for controlling said second named valve when said first named valve is closed to control the admission of air into said power device to deenergize it, and means subject to differential pressures in said power device to tend to open said second named valve.

HENRY W. HEY.
JEANNOT G. INGRES.